United States Patent
Hairston (10) Patent No.: US 11,288,461 B2
(45) Date of Patent: Mar. 29, 2022

(54) HIGH VOLTAGE GAIN SWITCHED CAPACITOR FILTER INTEGRATION

(71) Applicant: BAE Systems Information and Electronic Systems Integration Inc., Nashua, NH (US)

(72) Inventor: Allen W. Hairston, Andover, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 63 days.

(21) Appl. No.: 16/633,223

(22) PCT Filed: Jul. 27, 2017

(86) PCT No.: PCT/US2017/044133
§ 371 (c)(1),
(2) Date: Jan. 23, 2020

(87) PCT Pub. No.: WO2019/022741
PCT Pub. Date: Jan. 31, 2019

(65) Prior Publication Data
US 2020/0193099 A1    Jun. 18, 2020

(51) Int. Cl.
*G06G 7/184*    (2006.01)
*G06F 7/64*    (2006.01)

(52) U.S. Cl.
CPC ............... *G06G 7/184* (2013.01); *G06F 7/64* (2013.01)

(58) Field of Classification Search
CPC ........ G06G 7/18; G06G 7/184; G06G 7/1865; G06G 7/19
See application file for complete search history.

(56) References Cited

U.S. PATENT DOCUMENTS

| | | | |
|---|---|---|---|
| 5,841,310 A * | 11/1998 | Kalthoff | G06G 7/1865 327/337 |
| 6,040,568 A * | 3/2000 | Caulfield | H04N 5/33 250/208.1 |
| 6,910,060 B2 | 6/2005 | Langan et al. | |
| 8,039,811 B1 * | 10/2011 | Li | H04N 5/3575 250/370.14 |
| 10,009,014 B1 * | 6/2018 | Hairston | H03H 19/004 |
| 2004/0193670 A1 | 9/2004 | Langan et al. | |
| 2006/0125544 A1 | 6/2006 | Brady et al. | |
| 2008/0100280 A1 * | 5/2008 | Masson | G11C 27/026 324/76.38 |
| 2012/0062244 A1 * | 3/2012 | Santana | G01P 15/125 324/658 |
| 2013/0088594 A1 | 4/2013 | Wyles et al. | |
| 2015/0349753 A1 * | 12/2015 | Itakura | H03M 1/00 327/103 |
| 2016/0323524 A1 * | 11/2016 | Smith | H04N 5/35554 |
| 2020/0193099 A1 * | 6/2020 | Hairston | G06G 7/184 |

OTHER PUBLICATIONS

International Search Report, PCT/US17/44133, 8 pages, dated Oct. 5, 2017.

* cited by examiner

*Primary Examiner* — Emily E Larocque
*Assistant Examiner* — Carlo Waje
(74) *Attorney, Agent, or Firm* — Scott J. Asmus; Maine Cernota & Rardin (57) ABSTRACT

A method of operating switched capacitor filter integration circuits by pre-charging a final filter capacitor thereof with the final full voltage gain value during a first subframe to obtain an enhanced signal to noise ratio without changes to the circuit or components thereof.

15 Claims, 5 Drawing Sheets

HIGH VOLTAGE GAIN SWITCHED CAPACITOR FILTER INTEGRATION

FIELD

The disclosure relates to readout circuits, and more particularly, to a switched capacitor filter subframe integration scheme useful in readout integrated circuits.

BACKGROUND

Charge coupled devices (CCDs), complementary metal oxide semiconductor (CMOS) devices, and infrared imagers, which may be referred to generally as Solid State Area Array Imaging Devices (SSAAIDs), are used to capture images received in the form of light. They are currently widely used for both defense and commercial purposes. Some popular uses include digital cameras, scanners, cell phones, and surveillance devices.

SSAAIDs contain pixels arranged in a grid, which is referred to as a Focal Plane Array (FPA). Each pixel of an SSAAID generates and holds an amount of charge proportionate to the intensity of light incident thereon and the length of time that light was allowed to fall on the pixel using an integration circuit.

An integration circuit performs the mathematical operation of integration with respect to time. Said another way, the output voltage of an integration circuit is proportional to the input voltage, integrated over time (Output ∝ ∫Input). In the case of a pixel, the input voltage is generated by the impact of photons on a detector. The charge handling capacity of such a circuit is determined by voltage, integration time, and capacitance of its capacitor(s).

Furthermore, current SSAAIDs are limited in their ability to provide acceptable images in moderate to low light level conditions as well as in high light level conditions by the dynamic range of the integration circuit of the pixels. In low light level conditions, where there are relatively few incoming photons incident on any given pixel, the signal-to-noise ratio (SNR) of the output is very low, resulting in a grainy/noisy image in dark areas of the image. Moreover, in low SNR situations, other variables can also create non-uniformities in the images where the signal levels are not sufficient to overcome the sensitivity anomalies.

Pixel integration circuits may also become saturated in high light level conditions. When a large amount of light hits a pixel, the integration circuit of that pixel, and even those of nearby pixels, due to a phenomenon referred to as "blooming", become saturated, a situation that results in the integration circuit ceasing to be able to capture additional information. Saturation results in washed out images or portions thereof. Although anti-blooming circuits may be used to help reduce the impact of one or a cluster of saturated pixels on others, to increase high light level performance of a given pixel requires increasing the capacity, or well size, of its integration circuit, thereby preventing saturation over a given interval of time.

Prior art FPAs have used shorter integration times to provide better low gain, or high light, performance, but are less sensitive as a result and therefore less able to capture low light level conditions.

Prior art FPAs have also used switched capacitor filter circuits in such integration circuits to create a larger effective well capacity when the desired integration capacitor does not fit within the detector area. Their performance, however, especially their signal to noise ratio and gain flexibility, is not optimal for this application.

What is needed, therefore, are techniques for improving signal to noise ratio in switched capacitor filter integration circuits such that improvements in signal to noise ratio are realized while maintaining their current advantage of providing a larger effective well capacity when the desired integration capacitor does not fit within the detector area.

SUMMARY

The present disclosure describes a new way of operating switched capacitor filter integration circuits that improves their signal to noise ratio performance. The method is especially useful when reducing the number of subframes from a design value. Methods described herein allow for higher transimpedance gain for the same total integration time in a frame. Furthermore, the current advantage of switched capacitor filter integration circuits, i.e. providing a larger effective well capacity when the desired integration capacitor does not fit within the detector area, is maintained.

The method does not require extra components compared to the conventional circuit. Rather, the method disclosed herein accomplishes the aforementioned benefits using a more complex timing pattern as compared to prior art methods of operating switched capacitor filter integration circuits.

Specifically, by pre-charging a final filter capacitor of a switched capacitor filter integration circuit with the final full voltage gain value, significant benefits are obtained. This is done by running a first subframe with integration and filter capacitors combined as one larger integration capacitor, bypassing the switched capacitor filter, prior to reverting to more conventional switched capacitor filter timing.

Essentially, this can be thought of as pre-setting the sum capacitor based on the very first subframe alone to what is assumed to be close to its final value. This can be thought of more simply as starting a running average at what you believe the end average will be based on the first value obtained.

Such a method of operating the switched capacitor filter integration circuit gives reasonable voltage gain even when using numbers of subframes with relatively few switched capacitor filter time constants. Such a method also provides slightly better performance relative to prior art methods even when using the optimum number of subframes for signal to noise ratio.

Furthermore, the extra voltage obtained by operating the switched capacitor filter subframe integration circuit in accordance with the teachings of the present disclosure suppresses any additional readout noise caused by such a method of operation.

One embodiment of the present disclosure provides a method of operating a switched capacitor filter subframe integration circuit comprising: on a switched capacitor filter subframe integration circuit comprising a split switch, a sum switch, an integration capacitor, a split capacitor, and a sum capacitor: closing all switches, thereby resetting all capacitors; integrating a first subframe across all capacitors simultaneously; resetting the integration capacitor and split capacitor; integrating a second subframe on the integration capacitor and split capacitor; opening the split switch; closing the sum switch, thereby allowing the charge on the split capacitor to flow into the sum capacitor; repeating the above steps pertaining to integrating the second subframe as many times as desired to complete subframe integration with desired levels of voltage gain and noise.

Another embodiment of the present disclosure provides such a method wherein the sum capacitor is larger than the other capacitors.

A further embodiment of the present disclosure provides such a method wherein the integration time of the first subframe is longer than that of subsequent subframes in accordance with the ratio:

$$Fsint=(Cint+Csp+Csum)/(Cint+Csp)$$

Where:
Fsint=First Subframe Interval (ms)
Cint=Capacitance of the integration capacitor
Csp=Capacitance of the split capacitor
Csum=Capacitance of the sum capacitor Yet another embodiment of the present disclosure provides such a method wherein the combined capacitance of all capacitors is double that of the integration and split capacitors.

A yet further embodiment of the present disclosure provides such a method wherein integration time is scaled based on the size of the sum capacitor relative to the integration and split capacitors to maintain a desired gain.

Still another embodiment of the present disclosure provides such a method wherein the integration time is increased proportionately to the increase in capacitance to the switched capacitor filter subframe integration circuit.

One embodiment of the present disclosure provides a method of operating a switched capacitor filter subframe integration circuit comprising: during a first integration interval, setting the voltage of a sum capacitor equal to what is seen on an integration capacitor.

Another embodiment of the present disclosure provides such a method wherein the sum capacitor is larger than other capacitors included on the integration circuit.

A further embodiment of the present disclosure provides such a method wherein the integration time of the first subframe is longer than that of subsequent subframes in accordance with the ratio:

$$Fsint=(Cint+Csp+Csum)/(Cint+Csp)$$

Where:
Fsint=First Subframe Interval (ms)
Cint=Capacitance of an integration capacitor
Csp=Capacitance of a split capacitor
Csum=Capacitance of the sum capacitor Yet another embodiment of the present disclosure provides such a method wherein the combined capacitance of all capacitors present on the integration circuit is double that of an integration capacitor and a split capacitor present thereon.

A yet further embodiment of the present disclosure provides such a method wherein integration time is scaled based on the size of the sum capacitor relative to an integration capacitor and a split capacitor present on the integration circuit to maintain a desired gain.

Still another embodiment of the present disclosure provides such a method wherein integration time is increased proportionately to increase in capacitance.

One embodiment of the present disclosure provides a method of operating a switched capacitor filter subframe integration circuit comprising: on a switched capacitor filter subframe integration circuit comprising a split switch, a sum switch, an integration capacitor, a split capacitor, and a sum capacitor, wherein the switched capacitor filter subframe integration circuit is fixed to and in operative communication with a pixel: closing all switches, thereby resetting all capacitors; integrating a first subframe across all capacitors simultaneously; resetting the integration capacitor and split capacitor; integrating a second subframe on the integration capacitor and split capacitor; opening the split switch; closing the sum switch, thereby allowing the charge on the split capacitor to flow into the sum capacitor; repeating the above steps pertaining to integrating the second subframe as many times as desired to complete subframe integration with desired levels of voltage gain and noise.

Another embodiment of the present disclosure provides such a method wherein the sum capacitor is larger than the other capacitors.

A further embodiment of the present disclosure provides such a method wherein the integration time of the first subframe is longer than that of subsequent subframes in accordance with the ratio:

$$Fsint=(Cint+Csp+Csum)/(Cint+Csp)$$

Where:
Fsint=First Subframe Interval (ms)
Cint=Capacitance of the integration capacitor
Csp=Capacitance of the split capacitor
Csum=Capacitance of the sum capacitor Yet another embodiment of the present disclosure provides such a method wherein the combined capacitance of all capacitors is double that of the integration and split capacitors.

A yet further embodiment of the present disclosure provides such a method wherein integration time is scaled based on the size of the sum capacitor relative to the integration and split capacitors to maintain a desired gain.

Still another embodiment of the present disclosure provides such a method wherein the integration time is increased proportionately to the increase in capacitance to the switched capacitor filter subframe integration circuit.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
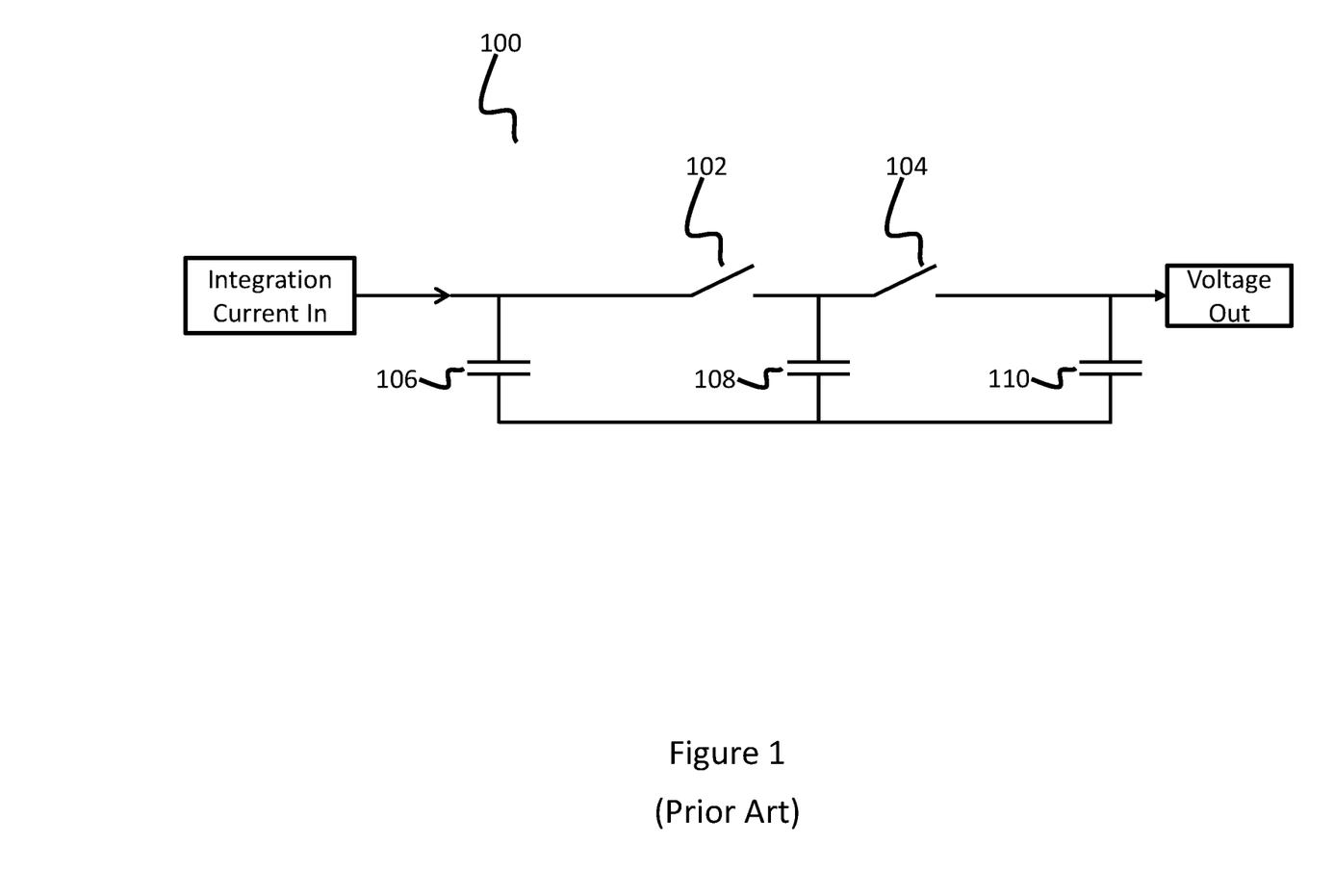
FIG. 1 is a schematic illustrating a conventional switched capacitor filter subframe integration circuit.

A typical switched capacitor filter subframe integration circuit 100 is shown in FIG. 1. The switched capacitor filter subframe integration circuit 100 comprises a split switch 102, a sum switch 104, an integration capacitor ($C_{int}$) 106, a split capacitor ($C_{sp}$) 108, and a sum capacitor ($C_{sum}$) 110.

The time constant of such a switched capacitor filter subframe integration circuit 100 is determined by the size of the split capacitor ($C_{sp}$) 108, with a larger split capacitor providing a shorter time constant. Specifically, the ratio of capacitance of $C_{sum}$ 110 to $C_{split}$ 108 determines the time constant.

Figure 2A:
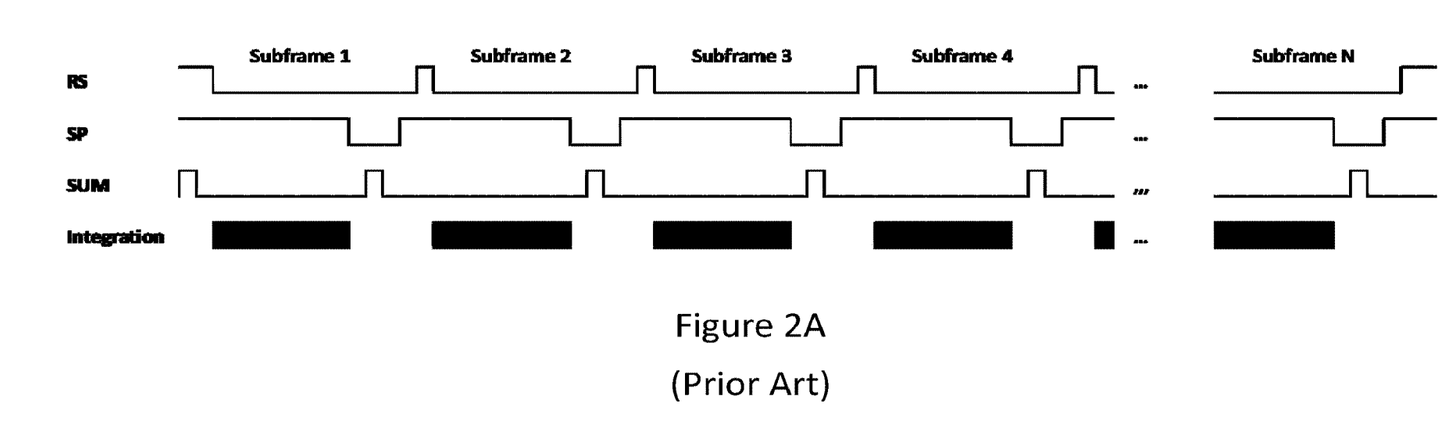
FIG. 2A is a chart illustrating switched capacitor filter subframe integration timing in a conventional subframe integration circuit.
Figure 2B:
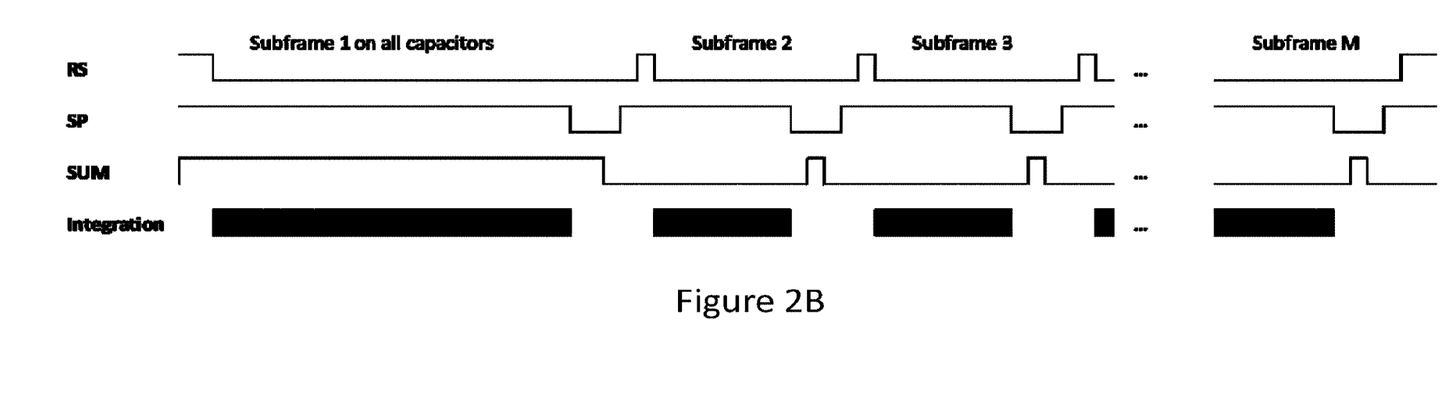
FIG. 2B is a chart illustrating switched capacitor filter subframe integration timing in a high voltage gain subframe integration circuit, in accordance with embodiments of the present disclosure.

Now referring to FIGS. 2A and 2B, the convention in these figures is that a high level indicates a closed switch and a low level indicates an open switch. The completion of a reset is indicated by the reset (RS) clock going low. The integration time is shown in black.

In each figure, the total integration time for each frame to be read out of the switched capacitor filter subframe integration circuit 100 is divided into a number of subframe integration times. At the beginning of the integration of each frame, all switches are closed and all capacitors are reset. During each subframe, there is an integration and filter timing sequence. Integration begins when the reset completes. Although the capacitors and switch are shown referenced to ground, in practice different reference voltages may be used for each of the capacitors and the reset switch in place of the ground.

During a normal integration interval, integration occurs on the integration capacitor 106 and split capacitor 108 only. Integration ends when the split switch 102 opens, as indicated by the falling split (SP) clock.

The SUM switch 104 closes following integration, allowing the charge on the split capacitor 108 to flow into the relatively larger sum capacitor 110. This charge sharing performs filtering, with a time constant determined by the ratio of the capacitance of the split capacitor 108 to that of the sum capacitor 110.

After summing, the integration capacitor 106 and split capacitor 108 are reset and integration is ready to begin again. The subframe timing is repeated as many times as desired to complete frame integration with desired levels of voltage gain and noise.

To summarize, switched capacitor filter subframe integration circuits 100 essentially create an effectively larger well than could be accomplished using a single well by filtering a number of short integration times for each frame. One disadvantage of this, however, is that such circuits operated in accordance with prior art methods require a number of subframes to build the voltage of the sum capacitor 110 to near that of the integration level.

The switched capacitor filter subframe integration circuit 100 operating in accordance with methods taught by the present disclosure described by the chart in FIG. 2B shows an alternate switched capacitor filter subframe integration circuit 100 timing that allows it to overcome this disadvantage while providing a better signal to noise ratio without sacrificing the inherent gain flexibility of this circuit.

The difference in behavior of the switched capacitor filter subframe integration circuit 100 operating in accordance with methods taught by the present disclosure described by FIG. 2B is due to the first subframe being integrated on all capacitors ($C_{int}$ 106, $C_{sp}$ 108, and $C_{sum}$ 110) simultaneously. In embodiments, subframe integration time is increased to provide similar gain values when making use of capacitors having larger values of capacitance. In embodiments, the first subframe timing is made longer in accordance with the ratio:

$$F_{sint} = (C_{int} + C_{sp} + C_{sum})/(C_{int} + C_{sp})$$

Where:
$F_{sint}$=First Subframe Interval (ms)
$C_{int}$=Capacitance of the integration capacitor 106
$C_{sp}$=Capacitance of the split capacitor 108
$C_{sum}$=Capacitance of the sum capacitor 110

By adjusting the first subframe interval in accordance with this ratio, it is made to exactly match the gain of subsequent shorter subframes, which are similar to those of the prior art standard switched capacitor filter timing. Using this timing ratio, the sum capacitor 110, from the start, is charged to its final value, assuming the integration current remains reasonably constant during the frame. Subsequent subframes are used to further reduce noise by providing further filtering. If the integration current does vary, the switched capacitor filter subframe integration circuit 100 operated in accordance with this method provides the same gain as a switched capacitor filter subframe integration circuit 100 operated in accordance with prior art techniques.

By way of example, if a switched capacitor filter subframe integration circuit 100 is thought of as a running averager, the technique described herein could be thought of as starting the running average with the initial value, rather than starting from zero, as had been done in the past.

Figure 3:
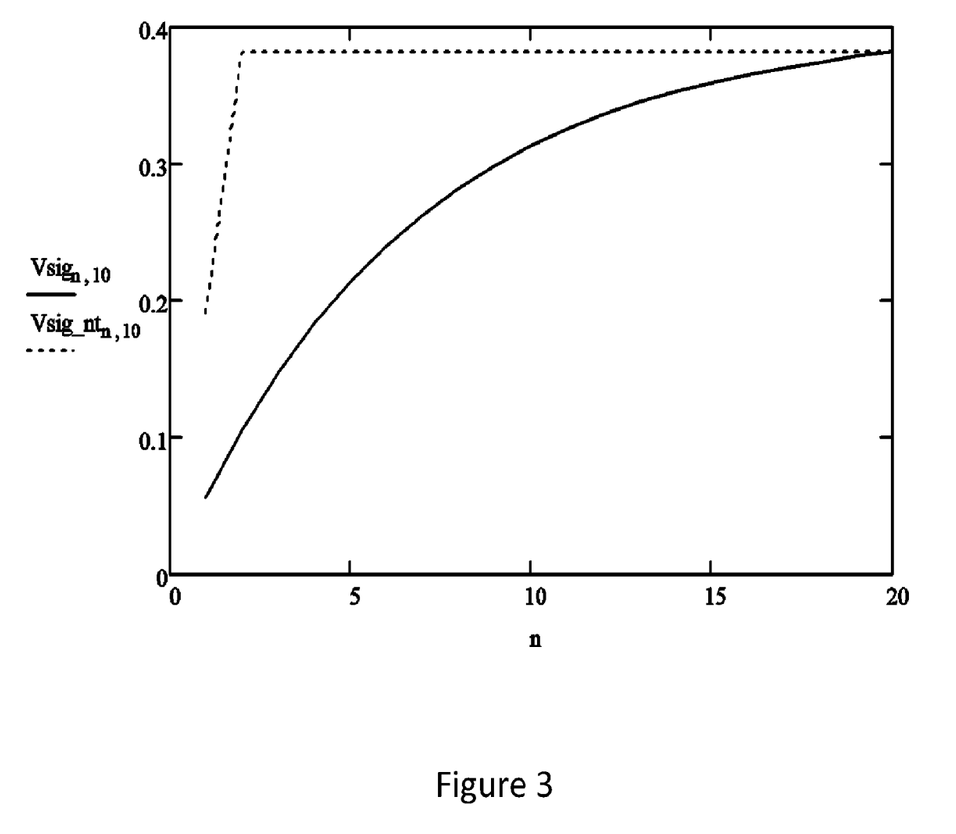
FIG. 3 is a graph illustrating the voltage output (y-axis) from a switched capacitor filter comparing standard and high voltage timing relative to the number of integration subframes (x-axis), in accordance with embodiments of the present disclosure.

Now referring to FIG. 3, the operation of both timing types is shown, as modeled in Mathcad, demonstrating the advantages of switched capacitor filter subframe integration circuits 100 operated in accordance with methods taught by the present disclosure using altered timing. FIG. 3 shows a Mathcad model of the two methods (conventional v. present disclosure) of operating a switched capacitor filter subframe integration circuit 100. The plot shows switched capacitor output voltage as a function of subframe number. For this model, the combined capacitance of all the capacitors ($C_{int}$ 106, $C_{sp}$ 108, and $C_{sum}$ 110) is double that of the integration capacitance ($c_{int}$+$C_{sp}$) alone, i.e. the capacitance of $C_{sum}$ 110 is equal to the integration capacitance. This results in the first subframe of the high voltage timing in accordance with embodiments of the present disclosure taking twice as long to readout as the first subframe of the standard timing.

For the modeling shown in FIG. 3, a 20% well fill is used to make read noise effects more apparent where the voltage gain is low. To maintain the same total integration time for both cases as a function of subframe number, the first subframe of the high voltage timing is divided into two subframes, with the first subframe having the value of the half-full well. This "half integration" value leads to the discontinuity associated with that point.

In FIG. 3, the solid line ($V_{sig_n,10}$) is the standard timing where voltage increases gradually with the number of subframes. The dashed line ($V_{sig\ nt_n,10}$) denotes high voltage timing in accordance with methods taught by the present disclosure where the voltage is set in the first double subframe up to the final value.

Following readout of the first subframe, the overall voltage level of the high voltage timing embodiment modeled in FIG. 3 does not change significantly, since, in this simulation, the input signal is held constant. If the actual signal flux changed, the output would follow it just as it would for a regular switched capacitor filter.

Figure 4:
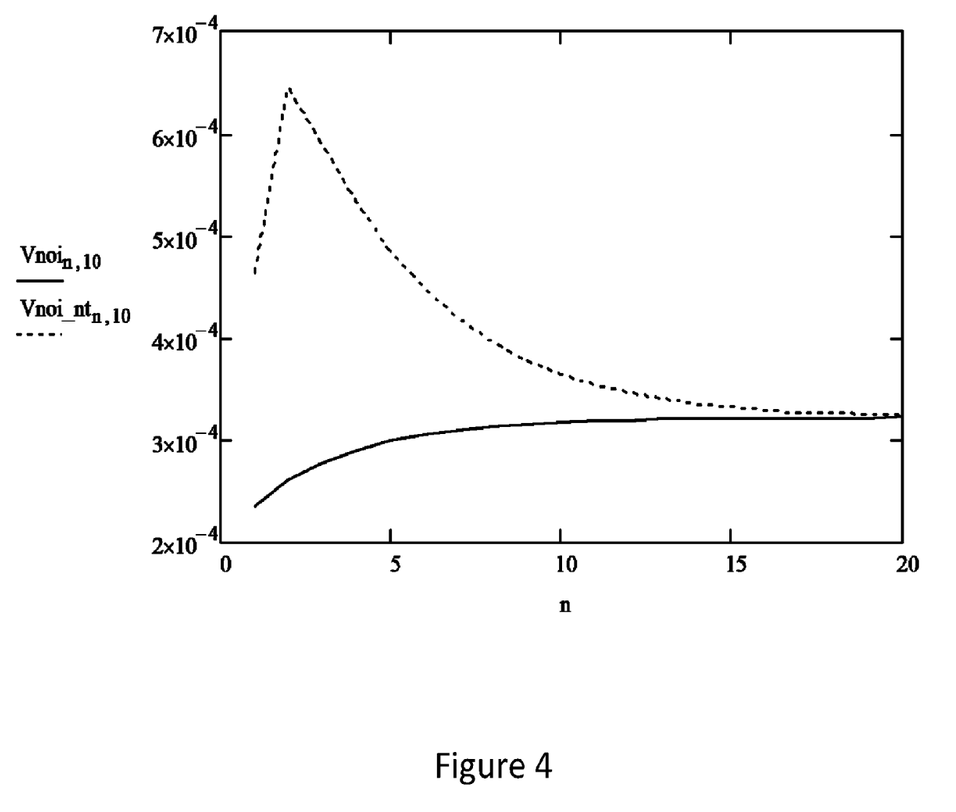
FIG. 4 is graph illustrating switched capacitor filter noise output (y-axis) for standard and high voltage timing relative to the number of subframes (x-axis), in accordance with embodiments of the present disclosure.

Now referring to FIG. 4, the noise output of a switched capacitor filter subframe integration circuit 100 as a function of subframes, including a read noise term, is shown. From this figure, it can be seen that noise starts relatively higher when employing high voltage timing in accordance with embodiments of the present disclosure (see dashed line, $V_{noi\_nt_n,10}$), before asymptotically approaching the same value as conventional methods of operating switched capacitor filter subframe integration circuits 100 ($V_{noin,10}$) as the readout of additional subframes is completed. The step present in the high voltage timing portion of the graph is an artifact created by the data point being halfway through the 1st subframe of that embodiment; the high point is the first valid data point. As will be shown by FIG. 5, despite the apparent noise advantage of prior art methods, when the SNR ratio of each method is taken into account, the superiority of the methods disclosed herein become clear.

Figure 5:
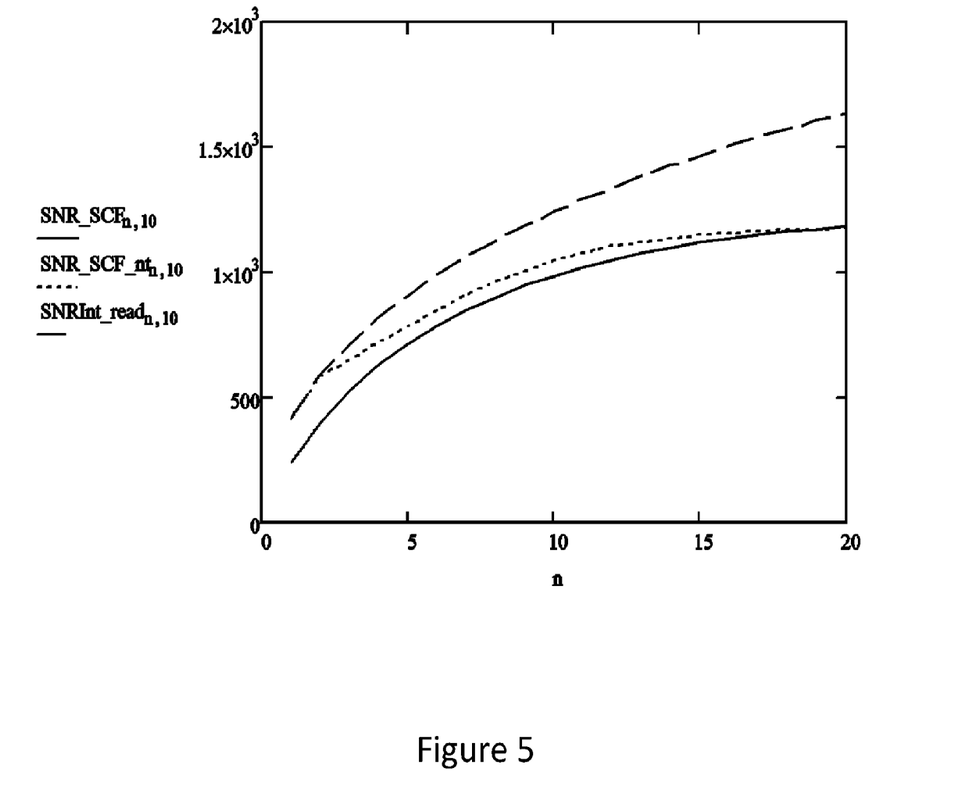
FIG. 5 is a graph illustrating switched capacitor filter signal to noise ratio for standard and high voltage timing compared to an ideal integrator with read noise relative to the number of subframes, in accordance with embodiments of the present disclosure.

Now referring to FIG. 5, the signal to noise ratio of the switched capacitor filter output is shown, highlighting the improved performance of switched capacitor filter subframe integration circuits 100 using the methods taught by the present disclosure compared to those of the prior art. In this graph, a higher signal to noise ratio indicates better performance. Included on this graph, in addition to conventional and modified methods, is a third case, an ideal integrator with readout noise (see long-dashed line, $SNR_{Int\_read_n,10}$). This ideal case assumes that the input cell allows for a single integration capacitor big enough to integrate the entire time, which is not often the case. It represents the maximum theoretically-obtainable performance of such a circuit, especially in the case of a small number of subframes.

It can be seen in FIG. 5 that high voltage timing (see short-dashed line, $SNR\_SCF\_nt_{n,10}$) bridges some of the performance gap between a switched capacitor filter subframe integration circuit 100 operated in accordance with prior art methods and the ideal integrator. For the first long subframe, the cases are identical, since the operation of the filter is exactly as one integration capacitor (the ideal case) up to that point. Following the first integration, performance of the switched capacitor filter subframe integration circuit 100 operated in accordance with the teachings of the present disclosure falls away slightly, but still improves on prior art methods of operating the switched capacitor filter subframe integration circuit 100. How long embodiments of the present disclosure maintain their performance benefit depends somewhat on the well fill, which is about 20% in the charted case shown in FIG. 5.

In embodiments, a first integration occurs over approximately 2 ms while subsequent integrations occur over approximately 1 ms per integration.

In embodiments, a first integration occurs over approximately 2.9 ms while subsequent integrations occur over approximately 1.45 ms per integration.

Although the present disclosure primarily discusses readout circuits, the concepts discussed herein could be applied to any application using a switched capacitor filter for distinct short periods.

The foregoing description of the embodiments of the disclosure has been presented for the purposes of illustration and description. It is not intended to be exhaustive or to limit the disclosure to the precise form disclosed. Many modifications and variations are possible in light of this disclosure. It is intended that the scope of the disclosure be limited not by this detailed description, but rather by the claims appended hereto.

What is claimed is:

1. A method of operating a switched capacitor filter subframe integration circuit comprising:
   on a switched capacitor filter subframe integration circuit comprising a split switch, a sum switch, an integration capacitor, a split capacitor, and a sum capacitor;
   closing the split switch and the sum switch, thereby resetting the integration capacitor, the split capacitor, and the sum capacitor;
   integrating a first subframe across the integration capacitor, the split capacitor, and the sum capacitor simultaneously;
   resetting the integration capacitor and the split capacitor;
   integrating a second subframe on the integration capacitor and the split capacitor;
   opening the split switch;
   closing the sum switch, thereby allowing the charge on the split capacitor to flow into the sum capacitor;
   repeating the step of integrating the second subframe as many times as desired to complete subframe integration with desired levels of voltage gain and noise;
   wherein an integration time of the first subframe is longer than that of subsequent subframes in accordance with the ratio:

$$F\text{sint} = (C_{int} + C_{sp} + C_{sum})/(C_{int} + C_{sp})$$

Where:
   $F_{sint}$=First Subframe Interval (ms)
   $C_{int}$=Capacitance of the integration capacitor
   $C_{sp}$=Capacitance of the split capacitor
   $C_{sum}$=Capacitance of the sum capacitor.

2. The method of claim 1 wherein the sum capacitor is larger than the integration capacitor and the split capacitor.

3. The method of claim 1 wherein a combined capacitance of the integration capacitor, the split capacitor, and the sum capacitor is double that of the integration and the split.

4. The method of claim 1 wherein the integration time is scaled based on the size of the sum capacitor relative to the integration and the split capacitor to maintain a desired gain.

5. The method of claim 1 wherein the integration time is increased proportionately to the increase in capacitance to the switched capacitor filter subframe integration circuit.

6. A method of operating a switched capacitor filter subframe integration circuit comprising:
   during a first integration, setting a voltage of a sum capacitor equal to what is seen on an integration capacitor,
   wherein an integration time of a first subframe is longer than that of subsequent subframes in accordance with the ratio:

$$F\text{sint} = (C_{int} + C_{sp} + C_{sum})/(C_{int} + C_{sp})$$

Where:
   $F_{sint}$=First Subframe Interval (ms)
   $C_{int}$=Capacitance of the integration capacitor
   $C_{sp}$=Capacitance of a split capacitor
   $C_{sum}$=Capacitance of the sum capacitor.

7. The method of claim 6 wherein the sum capacitor is larger than the integration capacitor and the split capacitor.

8. The method of claim 6 wherein a combined capacitance of the integration capacitor, the split capacitor, and the sum capacitor present on the integration circuit is double that of the integration capacitor and the split capacitor present thereon.

9. The method of claim 6 wherein the integration time is scaled based on the size of the sum capacitor relative to the integration capacitor and the split capacitor present on the integration circuit to maintain a desired gain.

10. The method of claim 6 wherein the integration time is increased proportionately to increase in capacitance.

11. A method of operating a switched capacitor filter subframe integration circuit comprising:
on a switched capacitor filter subframe integration circuit comprising a split switch, a sum switch, an integration capacitor, a split capacitor, and a sum capacitor, wherein the switched capacitor filter subframe integration circuit is fixed to and in operative communication with a pixel;
closing the split switch and the sum switch, thereby resetting the integration capacitor, the split capacitor, and the sum capacitor;
integrating a first subframe across the integration capacitor, the split capacitor, and the sum capacitor simultaneously;
resetting the integration capacitor and the split capacitor;
integrating a second subframe on the integration capacitor and the split capacitor;
opening the split switch;
closing the sum switch, thereby allowing the charge on the split capacitor to flow into the sum capacitor;
repeating the integration of the second subframe by repeating the steps of opening the split switch and closing the sum switch as many times as desired to complete subframe integration with desired levels of voltage gain and noise,
wherein an integration time of the first subframe is longer than that of subsequent subframes in accordance with the ratio:

$$F\text{sint} = (C_{int} + C_{sp} + C_{sum})/(C_{int} + C_{sp})$$

Where:
$F_{sint}$ = First Subframe Interval (ms)
$C_{int}$ = Capacitance of the integration capacitor
$C_{sp}$ = Capacitance of the split capacitor
$C_{sum}$ = Capacitance of the sum capacitor.

12. The method of claim 11 wherein the sum capacitor is larger than the integration capacitor and the split capacitor.

13. The method of claim 11 wherein a combined capacitance of the integration capacitor, the split capacitor, and the sum capacitor is double that of the integration and the split capacitor.

14. The method of claim 11 wherein the integration time is scaled based on the size of the sum capacitor relative to the integration and the split capacitor to maintain a desired gain.

15. The method of claim 11 wherein the integration time is increased proportionately to the increase in capacitance to the switched capacitor filter subframe integration circuit.

* * * * *